No. 725,371. PATENTED APR. 14, 1903.
G. F. W. SCHULTZE.
REGISTERING MEANS FOR COIN CONTROLLED WEIGHING MACHINES.
APPLICATION FILED NOV. 17, 1902.
NO MODEL.

WITNESSES:
D. B. Richards
Walter Jr. Vane

INVENTOR:
G. F. W. Schultze
by N. A. Acker
his Atty.

UNITED STATES PATENT OFFICE.

GUSTAV F. W. SCHULTZE, OF BERKELEY, CALIFORNIA.

REGISTERING MEANS FOR COIN-CONTROLLED WEIGHING-MACHINES.

SPECIFICATION forming part of Letters Patent No. 725,371, dated April 14, 1903.

Application filed November 17, 1902. Serial No. 131,649. (No model.)

*To all whom it may concern:*

Be it known that I, GUSTAV F. W. SCHULTZE, a citizen of the United States, residing at Berkeley, county of Alameda, State of California, have invented certain new and useful Improvements in Registering Means for Coin-Controlled Weighing-Machines; and I do hereby declare the following to be a full, clear, and exact description of the same.

The present invention relates more particularly to certain improvements upon the coin-controlled weighing-machine disclosed by Letters Patent No. 696,598, granted to me by the United States on the 1st day of April, 1902, the same consisting, essentially, in the improved means whereby the user of the machine may register a guess as to his weight prior to inserting a coin.

The means employed for actuating the weighing mechanism and operating the coin-returning mechanism is substantially the same as that fully set forth in my aforesaid Letters Patent. These features forming no portion of the present invention, explanation and illustration thereof are not deemed necessary to an understanding of this application, which relates solely to the means for registering a guess as to weight and disclosing to the user of the machine his weight.

In my aforesaid Letters Patent a rotatable scale-dial and a movable "set" dial are employed, likewise a shutter which normally closes a sight-opening. The use of the shutter and the necessity of making a comparison between the readings of the dials tend to confuse the user of the particular form of machine set forth in said Letters Patent.

The object of the present invention is to dispense with the shutter used to conceal the reading of the scale-dial and to so arrange the parts that the weight of the person and the registered guess as to weight will be designated upon a fixed dial-face at all times exposed to view.

To comprehend the invention, reference should be had to the accompanying sheet of drawings, wherein—

Figure 1:
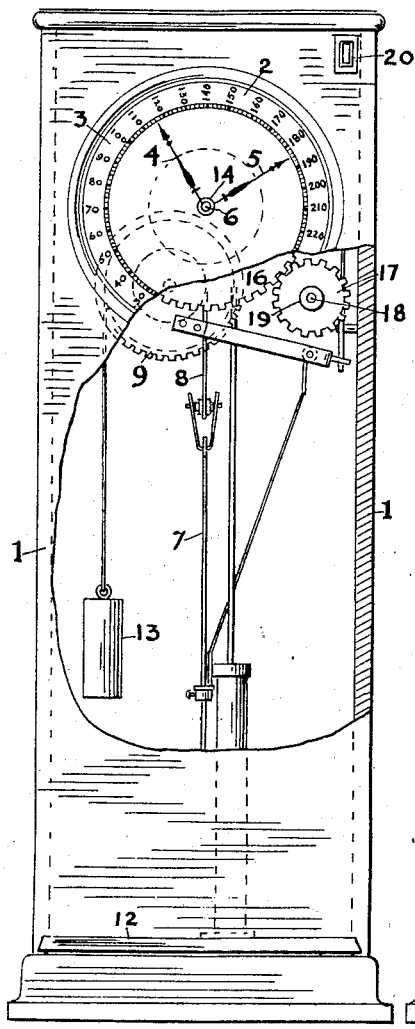
Figure 2:
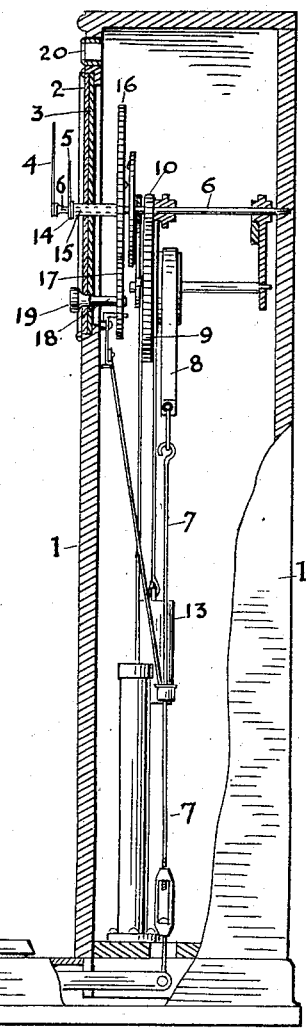
Figure 3:
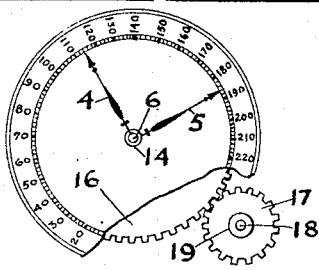

Figure 1 is a front view of the machine with its casing partly broken away. Fig. 2 is a side view in elevation, partly broken away; and Fig. 3 is a detail view of the registering means and the weight-indicating means removed from the machine.

The numeral 1 is used to indicate any suitable style of casing, the front of which near its upper portion is provided, preferably, with a glass covering 2. This covering protects a dial or face 3, rigidly secured to the frame. Said dial or face is provided near its outer edge with figures indicative of pound-weight ranging from zero to any desired number.

Upon the face or dial 3 works the hands or indicating devices 4 5, the former being operated by the scale-actuating mechanism and the latter by the registering means. Hand 4 I shall hereinafter term the "scale-hand," for the reason that it is actuated by the scale mechanism to denote the weight of the person using the scale, while hand 5 I shall hereinafter designate the "registry-hand," as it is actuated by the registry mechanism to record or indicate the guess made as to weight. The scale-hand is attached to the outer or projecting end of spindle 6, which extends through the casing-front. The movement of the spindle is controlled by the movement of scale-rod 7, which at its upper end is attached to band or strap 8, connected to the hub of gear 9, which gear 9 meshes with pinion 10. The lower end of the scale-rod 7 is attached to the inner end of the usual scale-beam, which at its outer end supports the scale-platform 12. From the hub of gear 9 is suspended the counterpoise-weight 13. Being thus connected, it is obvious that as the scale-rod 7 is moved downward or is moved upward the spindle 6 is free to rotate to cause the scale-hand 4 to indicate the weight of the person or to cause the same to return to zero. The registry-hand 5 is attached to a bushing 14, loosely fitted upon the projecting end of spindle 6. This bushing extends from the hub 15 of gear-wheel 16, also loosely fitted upon the spindle 6. The gear-wheel 16 meshes with pinion 17, secured to inner end of stud 18. This stud projects through the frame or casing 1, preferably below and to one side of the glass covering 2. To the outer projecting end of the stud 18 is attached the knob 19, by means of which the stud is turned. As this stud is turned its movement, through the medium of the intermeshing pinion and gear 17 16, is transmitted to the registry-hand 5.

The registry-hand 5 is in no manner whatever affected by the movement of the scale-hand 4 or by the operation of the scale-actuating mechanism.

The means for delivering the coin deposited within the receiving-slot 20 exteriorly or to retain the same within the machine, according to coincidence or diversity between the user's weight and his registered guess, also the means employed for locking the registry means after the insertion of a coin, is substantially the same as that heretofore fully forth in the Letters Patent No. 696,596, granted me on the 1st day of April, 1902.

In order to register a guess as to weight, the user of the machine turns the knob 19 until the registry-hand 5 through the medium of pinion 17 and intermeshing gear 16 indicates upon the dial or face 3 what is believed to be the weight of the person to be weighed. If the user has made a correct guess as to weight, then the scale-hand and the registry-hand will coincide as to position upon the scale dial or face 3. Should the scale-hand indicate a different position from that occupied by the registry-hand, a diversity as to the registered guess and the correct weight of the person is apparent. By simply noting the relative position of the scale and registry hands the user at a glance ascertains whether or not a correct registered guess as to weight has been made.

The feature of the present invention resides in the employment of a fixed dial or face exposed to view with hands or indicating devices working thereon, together with means whereby one of said hands or indicating devices may be operated by the user of the scale to register a guess as to weight, the other hand or indicating device being actuated by the machine mechanism to designate the weight of the person.

Having thus described the invention, what is claimed as new, and desired to be protected by Letters Patent, is—

1. In a machine of the described character, the combination with the weighing mechanism thereof, of exposed indicating device for displaying the weight of the user of the machine, of a similarly-exposed registry device for displaying a guess as to the weight of the person desiring to be weighed, set means operated from the exterior of the machine whereby the registry device is actuated to indicate a guess as to weight, connection between said set means and the exposed registry device whereby the said device is actuated by the movement of the set means to register a guess as to weight.

2. In a machine of the described character, the combination of an exposed fixed dial, of a scale-indicator and a registry-indicator working thereon, weighing mechanism which by the weight of the person being weighed actuates the scale-indicator, set means operated from the exterior of the machine whereby the registry-indicator is actuated to register a guess as to weight, connection between the said set means and the registry-indicator whereby the said indicator is actuated by the movement of the set means to disclose a guess as to weight.

3. In a machine of the described character, the combination with an exposed fixed dial, of a rotatable spindle, weight-actuated mechanism for imparting rotation to the spindle, an indicator affixed to the spindle so as to work upon the face of the dial, a gear-wheel loosely mounted upon the spindle, a registry device actuated by the movement of the gear-wheel, a pinion with which the gear-wheel meshes, and means whereby the pinion is actuated to operate the gear-wheel and registry device so as to permit of a guess being registered as to the weight of the person to be weighed.

In witness whereof I have hereunto set my hand.

GUSTAV F. W. SCHULTZE.

Witnesses:
  N. A. ACKER,
  D. B. RICHARDS.